United States Patent
Cmielowski et al.

(10) Patent No.: US 11,699,071 B2
(45) Date of Patent: Jul. 11, 2023

(54) EVALUATING SURROGATE MACHINE LEARNING MODELS

(71) Applicant: International Business Machines Corporation, Armonk, NY (US)

(72) Inventors: Lukasz G. Cmielowski, Cracow (PL); Wojciech Sobala, Cracow (PL); Rafal Bigaj, Cracow (PL); Maksymilian Erazmus, Zasów (PL)

(73) Assignee: International Business Machines Corporation, Armonk, NY (US)

( * ) Notice: Subject to any disclaimer, the term of this patent is extended or adjusted under 35 U.S.C. 154(b) by 856 days.

(21) Appl. No.: 16/689,414

(22) Filed: Nov. 20, 2019

(65) Prior Publication Data

US 2021/0150336 A1     May 20, 2021

(51) Int. Cl.
*G06N 3/08*     (2023.01)
*G06N 3/04*     (2023.01)
*G06N 5/022*     (2023.01)

(52) U.S. Cl.
CPC ................ *G06N 3/08* (2013.01); *G06N 3/04* (2013.01); *G06N 5/022* (2013.01)

(58) Field of Classification Search
CPC ............. G06N 3/08; G06N 3/04; G06N 5/022
USPC .......................................................... 706/25
See application file for complete search history.

(56) References Cited

U.S. PATENT DOCUMENTS

| | | | |
|---|---|---|---|
| 10,452,992 B2 * | 10/2019 | Lee | ........................ G06N 20/00 |
| 2019/0147371 A1 | 5/2019 | Deo et al. | |
| 2019/0156153 A1 | 5/2019 | Can et al. | |
| 2019/0156247 A1 | 5/2019 | Faulhaber, Jr. et al. | |
| 2021/0357778 A1 * | 11/2021 | Vrouwenvelder | ....... G06N 5/04 |
| 2023/0104757 A1 * | 4/2023 | Pramod | .................. G06N 3/084 706/11 |

OTHER PUBLICATIONS

Lamperti et al., Agent-Based Model Calibration using Machine Learning Surrogates, Published Apr. 7, 2017 via arXiv, pp. 1-32 (pdf).*
Jeremy Jordan, Evaluating a machine learning model, published Jul. 21, 2017, www.JeremyJordan.me, pp. 1-19 (pdf).*
Samadrita Ghosh, The Ultimate Guide to Evaluation and Selection of Models in Machine Learning, published Feb. 22, 2023 via neptune.ai, pp. 1-30 (pdf).*
"Augmented Numerical Propulsion System Simulation (NPSS) Surrogate Model", An IP.com Prior Art Database Technical Disclosure, IP.com No. IPCOM000248347D, IP.com Electronic Publication Date: Nov. 17, 2016, 4 pages.
"Evaluating ML Models", Amazon Machine Learning, printed Jun. 25, 2019, © 2019, Amazon Web Services, Inc. 2 pages. https://docs.aws.amazon.com/machine-learning/latest/dg/evaluating_models.html.

(Continued)

*Primary Examiner* — Manglesh M Patel
(74) *Attorney, Agent, or Firm* — James L. Olsen

(57) ABSTRACT

A first machine learning model processes a set of inputs to generate a first set of results. Based on that first set of results, a quality control range is calculated. A second machine learning model calculates a mean accuracy of a second set of results, based on the set of inputs. A determination of whether the mean accuracy of the second set of results is within the quality control range is made, and a user is notified of that determination.

20 Claims, 5 Drawing Sheets

(56) References Cited

OTHER PUBLICATIONS

Viana et al., "Making the Most out of Surrogate Models: Tricks of the Trade", Proceedings of the ASME 2010 International Design Engineering Technical Conferences & Computers and Information in Engineering Conference, IDETC/CIE 2010, Aug. 15-18, 2010, Montreal, Quebec, Canada, 13 pages. https://www.researchgate.net/publication/228784561 Making_the_Most_Out_of_Surrogate_Models_Tricks_of_the_Trade/link/54b83af60cf269d8cbf6c97f/download.

Hoffman et al., "Surrogate Model Development and Validation for Reliability Analysis of Reactor Pressure Vessels", Proceedings of the ASME 2016 Pressure Vessels and Piping Conference, PVP2016, Jul. 17-21, 2016, Vancouver, British Columbia, Canada, 10 pages. https://www.osti.gov/biblio/1363882.

Salem et al., "Automatic selection for general surrogate models", Article in Structural and Multidisciplinary Optimization, Aug. 2018, 13 pages, DOI: 10.1007/s00158-018-1925-3. https://www.researchgate.net/publication/316999697.

Institute of Quality & Reliability "Tables of Constants for Control Charts", 3 Pgs, <www.world-class-quality.com>.

\* cited by examiner

EVALUATING SURROGATE MACHINE LEARNING MODELS

BACKGROUND

The present disclosure relates generally to the field of machine learning model evaluation, and more particularly to evaluating surrogate machine learning models.

Machine learning models and neural networks are used with increasing frequency. Machine learning models may be used for a wide variety of applications, such as "reading" handwritten documents, making online shopping recommendations, generating dynamic navigation routes that take into account historical traffic density, etc.

SUMMARY

Embodiments of the present disclosure include a method, computer program product, and system for evaluating machine learning model quality.

A first machine learning model processes a set of inputs to generate a first set of results. Based on that first set of results, a quality control range is calculated. A second machine learning model calculates a mean accuracy of a second set of results, based on the set of inputs. A determination of whether the mean accuracy of the second set of results is within the quality control range is made, and a user is notified of that determination.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
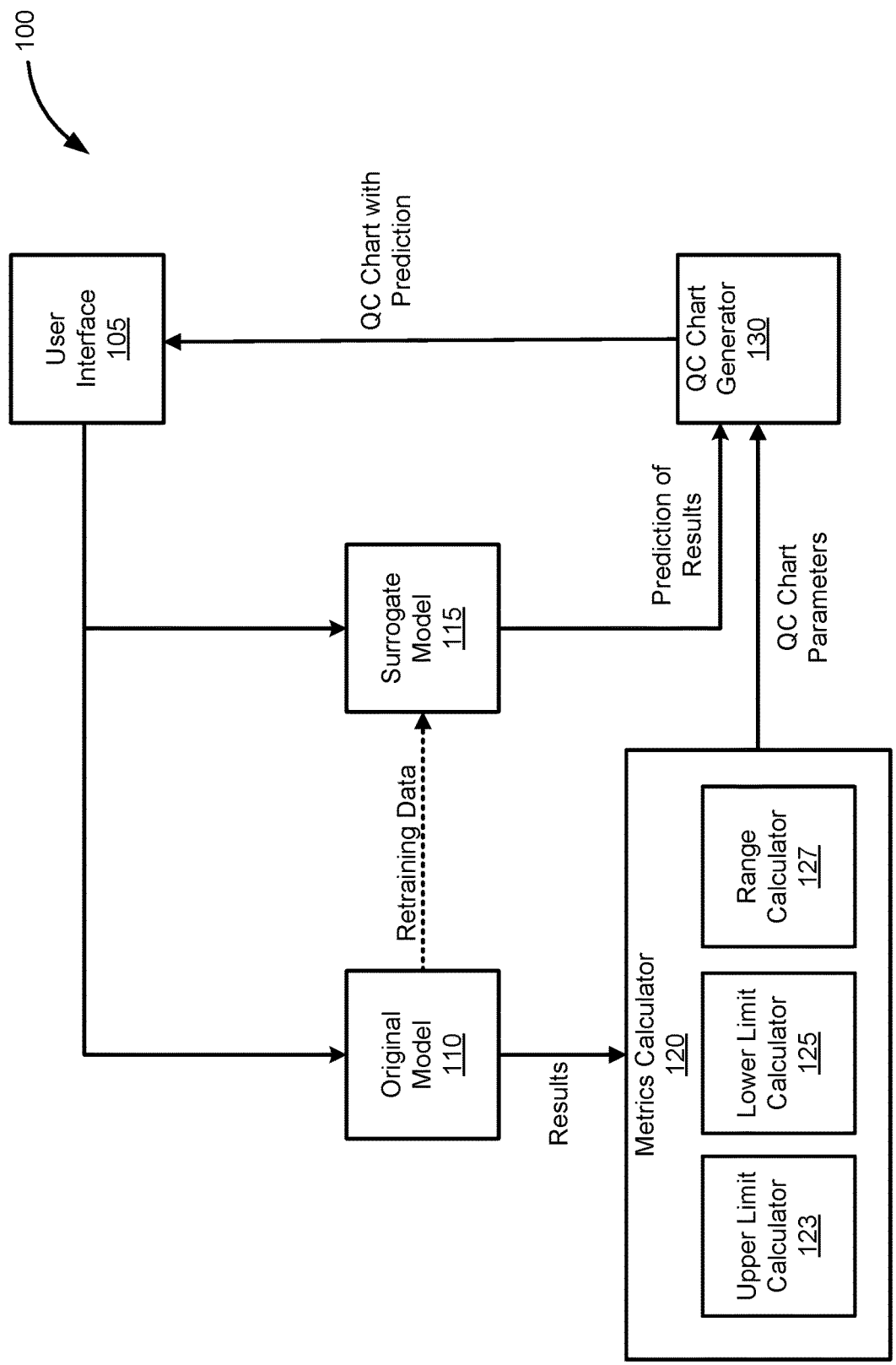
FIG. 1 illustrates an example computing environment, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of machine learning model evaluation, and more particularly to evaluating surrogate machine learning models. While the present disclosure is not necessarily limited to such applications, various aspects of the disclosure may be appreciated through a discussion of various examples using this context.

Predicting the outcome of a machine learning model may, in some instance, be performed using statistical analyses. However, when the complexity of a machine learning model increases, it may be more sensible to create a second machine learning model, or a surrogate machine learning model, to predict the accuracy of the original machine learning model. Determining whether the surrogate model's prediction is accurate may benefit the original model, and it may allow an administrator to correct any "drift" that may occur in the surrogate model.

Test data (e.g., input data for an original machine learning model) or feedback data (e.g., data derived from the results of the original machine learning model that may be used to adjust or improve the model) may be processed by an original machine learning model and used to calculate metrics related to the performance of the original machine learning model. For example, a baseline margin for accuracy may be developed by determining an average of a set of results, and further calculating an upper and lower limit to determine acceptable parameters for the baseline accuracy. In some embodiments, statistical analyses may be used to derive these parameters/limits (e.g., using standard deviation techniques, ANOVA (analysis of variance), ANCOVA (analysis of co-variance), etc.), or these parameters may be predetermined.

When evaluating the prediction of a surrogate model, the baseline margin for accuracy may be used to determine whether the prediction is accurate (e.g., whether the prediction falls within the acceptable accuracy limits), or whether the surrogate model may be suffering from systematic errors or random errors.

If the results/prediction from the surrogate model begin to "drift" (e.g., the surrogate model's prediction falls outside the upper/lower limits), then retraining data (e.g., feedback data from the original model) may be used to calibrate the surrogate model and bring it back into control.

Referring now to FIG. 1, illustrated is an example computing environment 100, in accordance with embodiments of the present disclosure. Example computing environment 100 may be completely enclosed within a single physical or virtual device, or it may be distributed across a plurality of physical and/or virtual devices (e.g., via a network or a cloud computing scheme).

In some embodiments, example computing environment 100 may include a user interface 105, original model 110, surrogate model 115, metrics calculator 120, and QC chart generator 130. In some embodiments, user interface 105 may include, for example, a smartphone, a tablet, a desktop computing system, or other computing device with a touchscreen, mouse and keyboard, visual display, etc. wherewith a user may input commands and receive outputs from the computing system.

User interface 105 may be used by a user to input data into original model 110 and/or surrogate model 115. Original model 110 may be implemented using a neural network, such as the neural network described in FIG. 4. Original model 110 may be configured for any purpose for which a neural network may be suitable. For example, original model 110 may be configured to recognize handwritten text, to recognize emotional sentiment from spoken words, to generate online shopping recommendations for a user, etc. (e.g., a "main purpose").

The results output from original model 110 may, in addition to being distributed for their main purpose, sent to metrics calculator 120. In some embodiments, metrics calculator 120 may include an upper limit calculator 123, a lower limit calculator 125, and a range calculator 127. Metrics calculator 120 may gather batches of results ("$a_1, a_2, a_3 \ldots a_n$, where 'a' represents a single batch") and employ upper limit calculator 123, lower limit calculator 125, and range calculator 127 to generate the upper limit, lower limit, and range, respectively, of a quality control (QC) control chart for evaluating the accuracy of surrogate model 115.

Metrics calculator 120 may employ functions, such as "average," which calculates a mean on a provided collection (e.g., $a_1, \ldots a_n$); "max," which selects a maximum value in a provided collection; and "min," which selects a minimum value in a provided collection.

In some embodiments, range calculator 127 may calculate a range ("R") for a QC chart according to: $R = \max(a_1, \ldots, a_n) - \min(a_1, \ldots, a_n)$. In some embodiments, the range (e.g., a quality control range) may include a logistical distance between a maximum and a minimum of the provided collection.

In some embodiments, upper limit calculator 123 may calculate an upper limit for a QC chart according to: average($a_1, \ldots, a_n$)+R*A2. A2 may be a normalizing constant (e.g., a control limits factor) derived according to the number of batches in a provided collection, or it may be a predetermined value assigned by a user or an organization.

In some embodiments, lower limit calculator 125 may calculate a lower limit for a QC chart according to: average ($a_1, \ldots, a_n$)−R*A2.

Once metrics calculator 120 has generated the range, upper limit, and lower limit (e.g., "QC chart parameters"), the information/data may be passed to QC chart generator 130.

Figure 4:
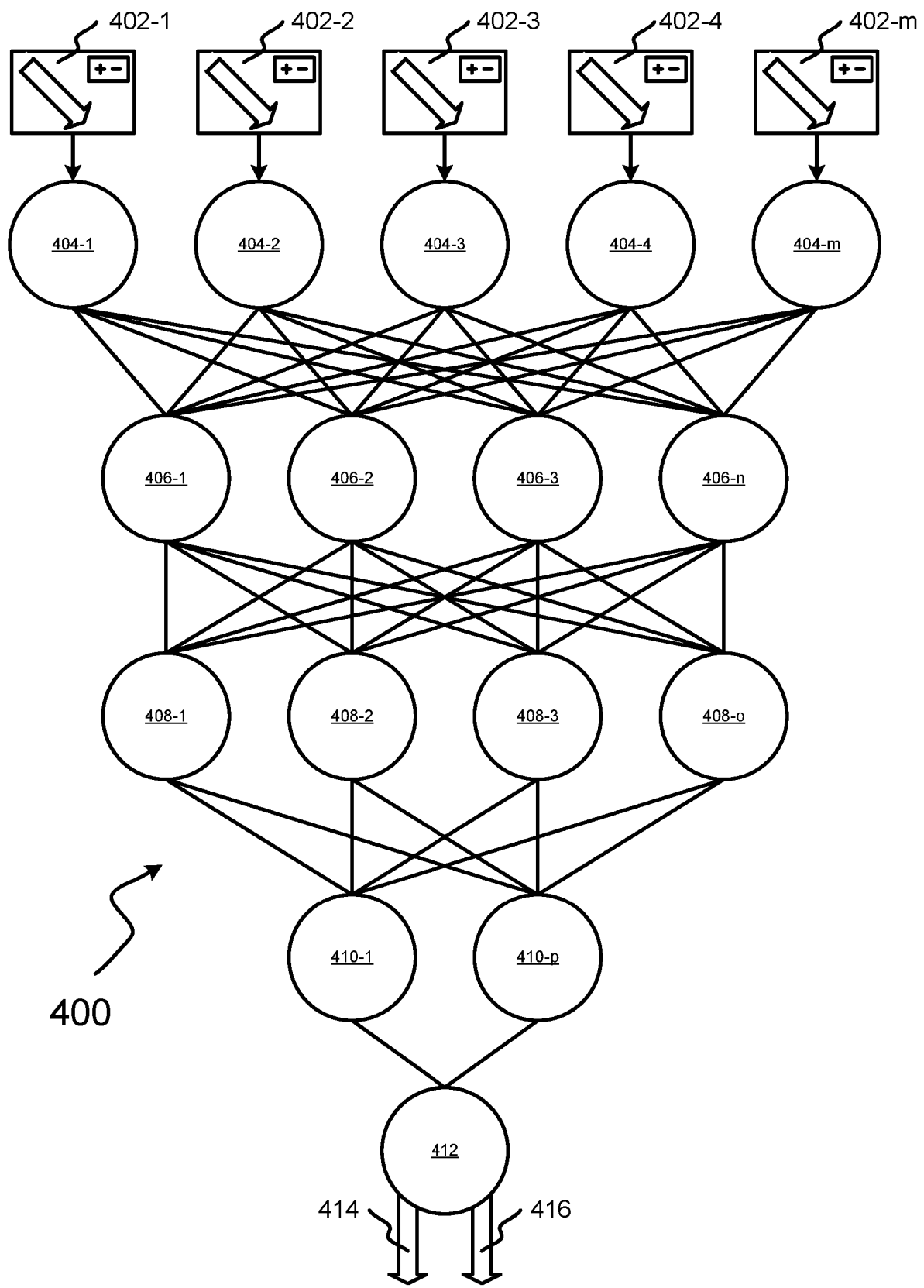
FIG. 4 illustrates an example neural network that may be used as a machine learning model or surrogate machine learning model, in accordance with embodiments of the present disclosure.

Surrogate model 115 may also be implemented using a neural network, such as the neural network described in FIG. 4. Surrogate model 115 may be configured to ingest the same inputs as original model 110, but is configured to make a prediction as to the accuracy of the original model 110. In some embodiments, surrogate model 115 may achieve this using data aggregation and/or multiple processing cycles to produce a set of results that may be averaged or otherwise combined into a composite prediction of the batches of results of original model 110. Surrogate model 115 may pass the prediction to QC chart generator 130.

In some embodiments, surrogate model 115 may output batches of predictions to QC chart generator 130, which may calculate an aggregate average of the predictions to arrive at a mean accuracy, which may be plotted as points on a QC chart generated by QC chart generator 130. QC chart generator 130 may receive the QC chart parameters from metrics calculator 120 and the prediction from surrogate model 115 to produce a QC chart with one or more predictions plotted thereon. An example of a QC chart is given with respect to FIG. 2.

In some embodiments, the QC chart generated by QC chart generator 130 may indicate a calibration of surrogate model 115 is needed. In such embodiments, retraining data may be sent to surrogate model 115 from original model 110. In other embodiments, retraining data may be retrieved from a repository of outputs (not shown), which stores the outputs of original model 110.

In yet other embodiments, calibration of surrogate model 115 may be performed by adjusting a weight and/or a bias of one or more neural network edges within surrogate model 115 such that the adjustment causes the output of surrogate model 115 to fall within the upper and lower limits of the QC chart generated by QC chart generator 130.

In yet other embodiments, the entire process of generating outputs from original model 110, surrogate model 115, and a subsequent calibration of surrogate model 115 may be fully automated such that no QC chart generation is necessary.

Figure 2:
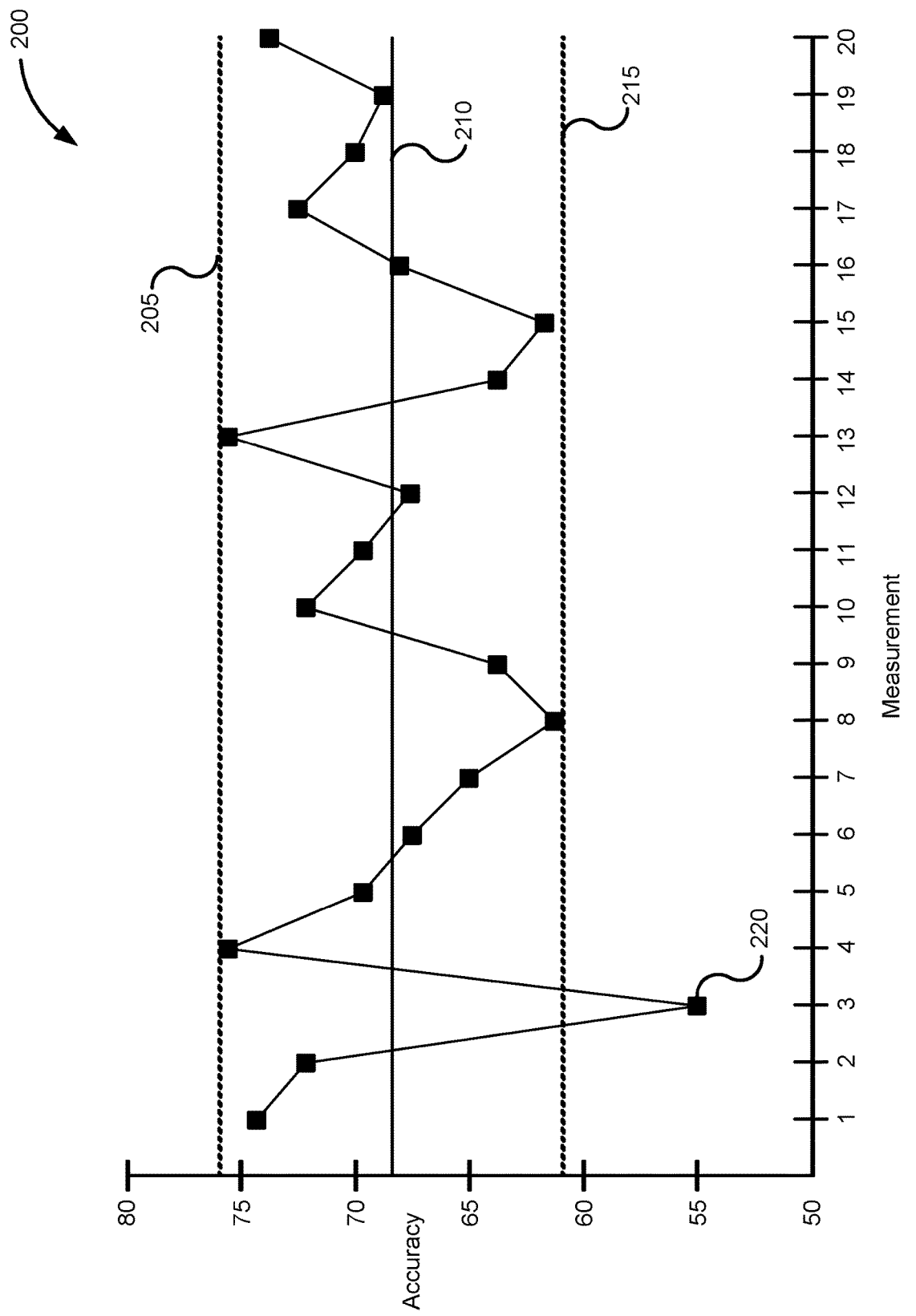
FIG. 2 illustrates an example of a quality control chart, in accordance with embodiments of the present disclosure.

Referring now to FIG. 2, illustrated is an example of a quality control chart 200, in accordance with embodiments of the present disclosure. Example QC chart 200 may include upper limit 205, average 210, and lower limit 215. Upper limit 205 may be represent the upper limit generated by upper limit calculator 123 of FIG. 1. Lower limit 215 may represent the lower limit generated by lower limit calculator 127 of FIG. 1. Average 210 may represent the average of a provided collection of results, as described herein.

The example QC chart 200 illustrates 20 plotted points corresponding to the mean accuracies generated from the predictions of a surrogate model, such as surrogate model 115 of FIG. 1. In the example QC chart 200, the plotted point 220 lies outside the lower limit 215, and therefore represents a "drift" of the predictions of the relevant surrogate model. A drift of mean accuracies may represent a systematic error in the predictions of the surrogate model. In some embodiments, the relevant surrogate model may be corrected through calibration using retraining data from the original model 110.

Example QC chart 200 may, in some embodiments, be presented to a user or system administrator via user interface 105. In some embodiments, a calibration of surrogate model 115 may be performed automatically, or it may be performed in response to a command from a user or system administrator.

Figure 3:
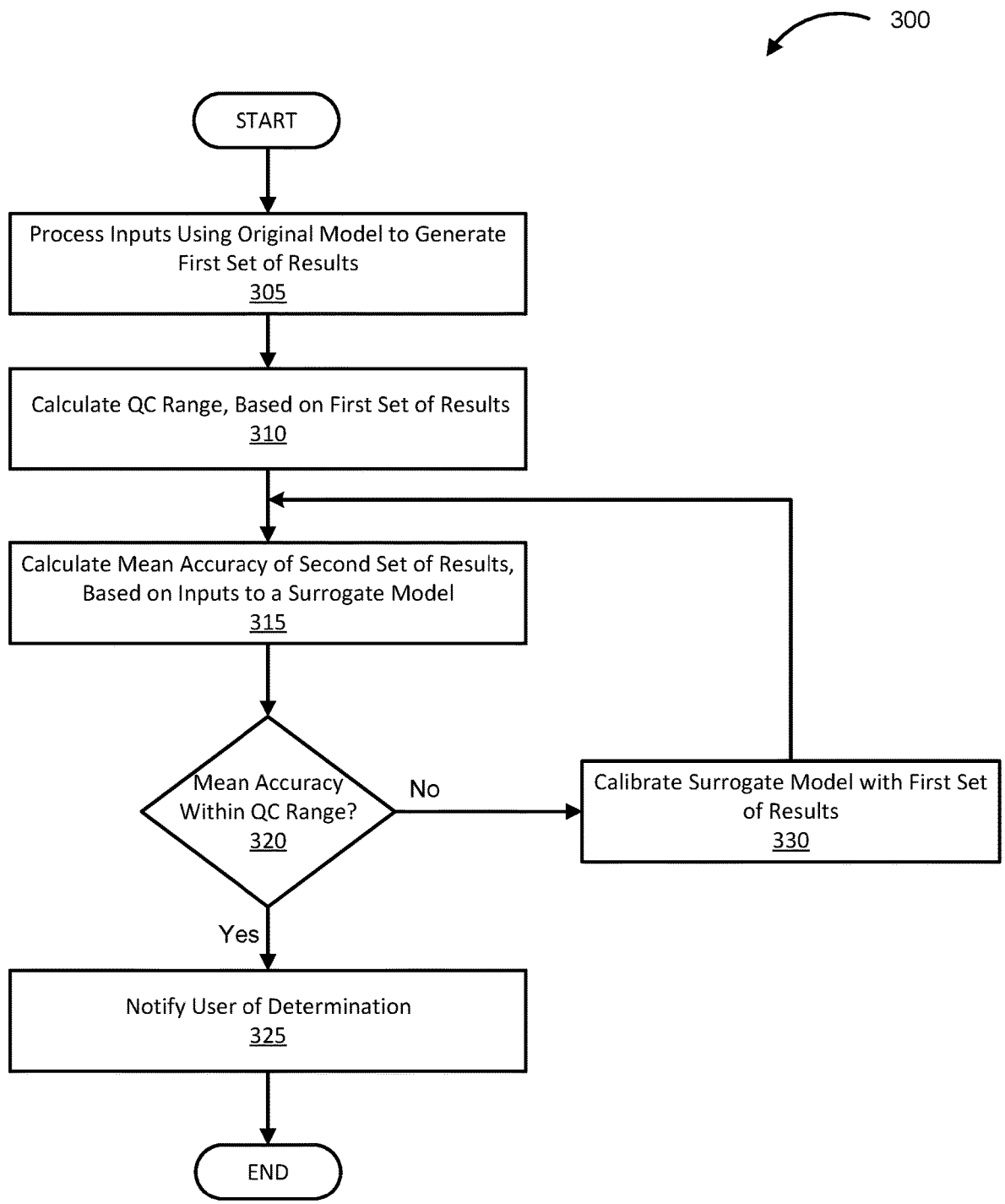
FIG. 3 illustrates a flowchart of a method for evaluating machine learning model quality, in accordance with embodiments of the present disclosure.

Referring now to FIG. 3, illustrated is a flowchart of a method 300 for evaluating machine learning model quality, in accordance with embodiments of the present disclosure. Method 300 may begin at 305, where inputs are processed using an original model to generate a first set of results, as described herein.

At 310, a QC range is calculated, based on the first set of results. In some embodiments, 310 may be performed by a metrics calculator substantially similar to the metrics calculator 120. In some embodiments, a QC range may include an upper limit, lower limit, and average, such as those described with regard to FIGS. 1 & 2.

At 315, a mean accuracy of a second set of results may be calculated, based on inputs to a surrogate model. In some embodiments, the mean accuracy of the second set of results may be substantially similar to the mean accuracy described with regard to FIG. 1.

At 320, it may be determined whether the mean accuracy falls within the QC range, as described herein. This may include, for example, a determination whether the mean accuracy falls between the upper and lower limits, or outside the upper and lower limits (e.g., whether the mean accuracy is "in control" or "out of control").

If, at 320, it is determined that the mean accuracy is in control, a user is notified of the determination at 325. This may include, in some embodiments, a notification displayed on user interface 105 or any other suitable communication to a user (e.g., a text message, e-mail, overlay onto a VR/AR enabled user device, etc.).

If, however, at 320, it is determined that the mean accuracy is out of control, the surrogate model is calibrated with the first set of results (e.g., results from the original model) at 330. In some embodiments, a calibration of the surrogate model may include using the results from the original model to adjust a weight and/or a bias of one or more edges of the neural network employed by the surrogate model. In this way, the calibration may correct a "drift" of the surrogate model to bring the prediction(s) made by the surrogate model back into control.

FIG. 4 depicts an example neural network 400 that may be used to implement a machine learning model or surrogate machine learning model, in accordance with embodiments of the present disclosure. In embodiments, neural network 400 may be a classifier-type neural network. Neural network 400 may be part of a larger neural network. For example, neural network 400 may be nested within a single, larger neural network, connected to several other neural networks, or connected to several other neural networks as part of an overall aggregate neural network.

Inputs 402-1 through 402-m represent the inputs to neural network 400. In this embodiment, 402-1 through 402-m do not represent different inputs. Rather, 402-1 through 402-m represent the same input that is sent to each first-layer neuron (neurons 404-1 through 404-m) in neural network 400. In some embodiments, the number of inputs 402-1 through 402-m (i.e., the number represented by m) may equal (and thus be determined by) the number of first-layer neurons in the network. In other embodiments, neural network 400 may incorporate 1 or more bias neurons in the first layer, in which case the number of inputs 402-1 through 402-m may equal the number of first-layer neurons in the network minus the number of first-layer bias neurons. In some embodiments, a single input (e.g., input 402-1) may be input into the neural network. In such an embodiment, the first layer of the neural network may comprise a single neuron, which may propagate the input to the second layer of neurons.

Inputs 402-1 through 402-m may comprise one or more samples of classifiable data. For example, inputs 402-1 through 402-m may comprise 10 samples of classifiable data. In other embodiments, not all samples of classifiable data may be input into neural network 400.

Neural network 400 may comprise 5 layers of neurons (referred to as layers 404, 406, 408, 410, and 412, respectively corresponding to illustrated nodes 404-1 to 404-m, nodes 406-1 to 406-n, nodes 408-1 to 408-o, nodes 410-1 to 410-p, and node 412). In some embodiments, neural network 400 may have more than 5 layers or fewer than 5 layers. These 5 layers may each be comprised of the same number of neurons as any other layer, more neurons than any other layer, fewer neurons than any other layer, or more neurons than some layers and fewer neurons than other layers. In this embodiment, layer 412 is treated as the output layer. Layer 412 outputs a probability that a target event will occur and contains only one neuron (neuron 412). In other embodiments, layer 412 may contain more than 1 neuron. In this illustration no bias neurons are shown in neural network 400. However, in some embodiments each layer in neural network 400 may contain one or more bias neurons.

Layers 404-412 may each comprise an activation function. The activation function utilized may be, for example, a rectified linear unit (ReLU) function, a SoftPlus function, a Soft step function, a SIFT algorithm, or others. Each layer may use the same activation function, but may also transform the input or output of the layer independently of or dependent upon the activation function. For example, layer 404 may be a "dropout" layer, which may process the input of the previous layer (here, the inputs) with some neurons removed from processing. This may help to average the data, and can prevent overspecialization of a neural network to one set of data or several sets of similar data. Dropout layers may also help to prepare the data for "dense" layers. Layer 406, for example, may be a dense layer. In this example, the dense layer may process and reduce the dimensions of the feature vector (e.g., the vector portion of inputs 402-1 through 402-m) to eliminate data that is not contributing to the prediction. As a further example, layer 408 may be a "batch normalization" layer. Batch normalization may be used to normalize the outputs of the batch-normalization layer to accelerate learning in the neural network. Layer 410 may be any of a dropout, hidden, or batch-normalization layer. Note that these layers are examples. In other embodiments, any of layers 404 through 410 may be any of dropout, hidden, or batch-normalization layers. This is also true in embodiments with more layers than are illustrated here, or fewer layers.

Layer 412 is the output layer. In this embodiment, neuron 412 produces outputs 414 and 416. Outputs 414 and 416 represent complementary probabilities that a target event will or will not occur. For example, output 414 may represent the probability that a target event will occur, and output 416 may represent the probability that a target event will not occur. In some embodiments, outputs 414 and 416 may each be between 0.0 and 1.0, and may add up to 1.0. In such embodiments, a probability of 1.0 may represent a projected absolute certainty (e.g., if output 414 were 1.0, the projected chance that the target event would occur would be 100%, whereas if output 416 were 1.0, the projected chance that the target event would not occur would be 100%).

In embodiments, FIG. 4 illustrates an example probability-generator neural network with one pattern-recognizer pathway (e.g., a pathway of neurons that processes one set of inputs and analyzes those inputs based on recognized patterns, and produces one set of outputs). However, some embodiments may incorporate a probability-generator neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well (e.g., several smaller vectors may merge to create one vector). This merger may increase the ability to identify correlations in the patterns identified among different inputs, as well as eliminate data that does not appear to be relevant.

In embodiments, neural network 400 may be trained/adjusted (e.g., biases and weights among nodes may be calibrated) by inputting feedback and/or input from a user to correct/force the neural network to arrive at an expected output. In embodiments, the impact of the feedback on the weights and biases may lessen over time, in order to correct for inconsistencies among user(s) and/or datasets. In embodiments, the degradation of the impact may be implemented using a half-life (e.g., the impact degrades by 50% for every time interval of X that has passed) or similar model (e.g., a quarter-life, three-quarter-life, etc.).

Figure 5:
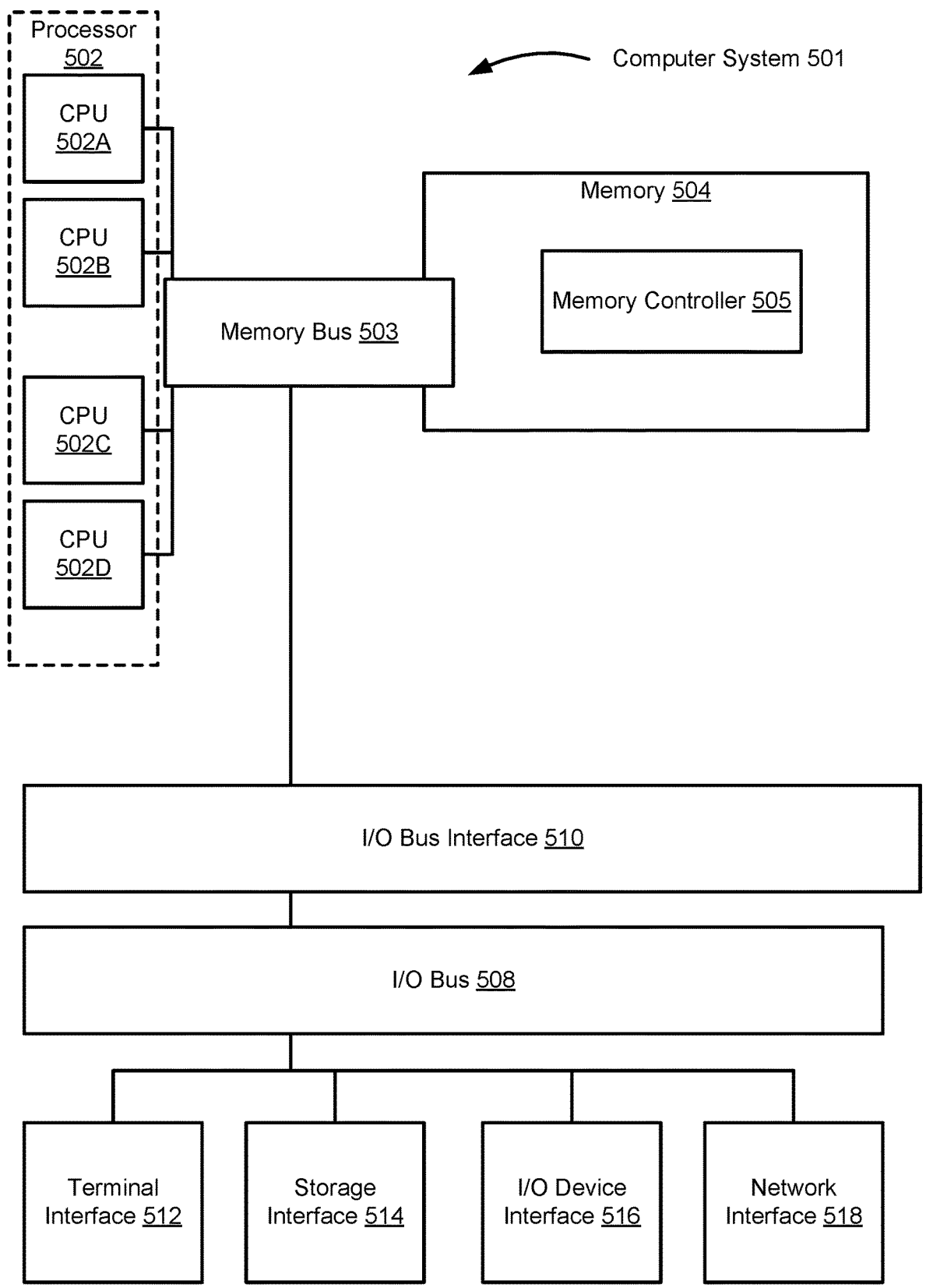
FIG. 5 illustrates a high-level block diagram of an example computer system that may be used in implementing embodiments of the present disclosure.

Referring now to FIG. 5, shown is a high-level block diagram of an example computer system 501 that may be configured to perform various aspects of the present disclosure, including, for example, method 300, described in FIG. 3. The example computer system 501 may be used in implementing one or more of the methods or modules, and any related functions or operations, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may comprise one or more levels of on-board cache.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 501, and may also include the virtual memory of other computer systems coupled to the computer system 501 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505.

Although the memory bus 503 is shown in FIG. 5 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for evaluating machine learning model quality, the method comprising:
   processing, by a first machine learning model, a set of inputs to generate a first set of results;
   calculating, based on the first set of results, a quality control range;
   calculating, by a second machine learning model, a mean accuracy of a second set of results, based on the set of inputs;
   determining whether the mean accuracy of the second set of results is within the quality control range; and
   notifying a user of the determination.

2. The method of claim 1 further comprising:
   in response to determining the mean accuracy of the second set of results is not within the quality control range, calibrating the second machine learning model.

3. The method of claim 2, wherein calibrating the second machine learning model further comprises retraining the second machine learning model using the first set of results.

4. The method of claim 2, wherein calibrating the second machine learning model further includes adjusting a weight of one or more neural network edges.

5. The method of claim 4, wherein calibrating the second machine learning model further includes adjusting a bias of one or more neural network edges.

6. The method of claim 5, wherein the quality control range comprises a logical distance between a maximum and a minimum of the first set of results.

7. The method of claim 6, wherein an upper control limit of the quality control range is defined as the sum of:
   an average of the first set of results; and
   a product of the logical distance and a control limits factor constant.

8. The method of claim 7, wherein a lower control limit of the quality control range is defined as the difference of:
   the average of the first set of results; minus
   the product of the logical distance and the control limits factor constant.

9. A computer program product for evaluating machine learning model quality, the computer program product comprising a computer readable storage medium having program instructions embodied therewith, the program instructions executable by a device to cause the device to:
   process, by a first machine learning model, a set of inputs to generate a first set of results;
   calculate, based on the first set of results, a quality control range;
   calculate, by a second machine learning model, a mean accuracy of a second set of results, based on the set of inputs;

determine whether the mean accuracy of the second set of results is within the quality control range; and notify a user of the determination.

10. The computer program product of claim 9, wherein the program instructions further cause the device to:

in response to determining the mean accuracy of the second set of results is not within the quality control range, calibrate the second machine learning model.

11. The computer program product of claim 10, wherein calibrating the second machine learning model further comprises retraining the second machine learning model using the first set of results.

12. The computer program product of claim 10, wherein calibrating the second machine learning model further includes adjusting a weight of one or more neural network edges.

13. The computer program product of claim 12, wherein calibrating the second machine learning model further includes adjusting a bias of one or more neural network edges.

14. The computer program product of claim 13, wherein the quality control range comprises a logical distance between a maximum and a minimum of the first set of results.

15. The computer program product of claim 14, wherein an upper control limit of the quality control range is defined as the sum of:

an average of the first set of results; and a product of the logical distance and a control limits factor constant.

16. The computer program product of claim 15, wherein a lower control limit of the quality control range is defined as the difference of:

the average of the first set of results; minus the product of the logical distance and the control limits factor constant.

17. A system for evaluating machine learning model quality, comprising:

a memory with program instructions included thereon; and a processor in communication with the memory, wherein the program instructions cause the processor to:

process, by a first machine learning model, a set of inputs to generate a first set of results;

calculate, based on the first set of results, a quality control range;

calculate, by a second machine learning model, a mean accuracy of a second set of results, based on the set of inputs;

determine whether the mean accuracy of the second set of results is within the quality control range; and notify a user of the determination.

18. The system of claim 17, wherein the program instructions further cause the processor to:

in response to determining the mean accuracy of the second set of results is not within the quality control range, calibrate the second machine learning model.

19. The system of claim 18, wherein calibrating the second machine learning model further comprises retraining the second machine learning model using the first set of results.

20. The system of claim 18, wherein calibrating the second machine learning model further includes adjusting a weight of one or more neural network edges.

* * * * *